C. F. KETTERING.
CONTROL FOR ELECTRIC LIGHTING SYSTEMS.
APPLICATION FILED AUG. 10, 1911.
1,066,432.
Patented July 1, 1913.
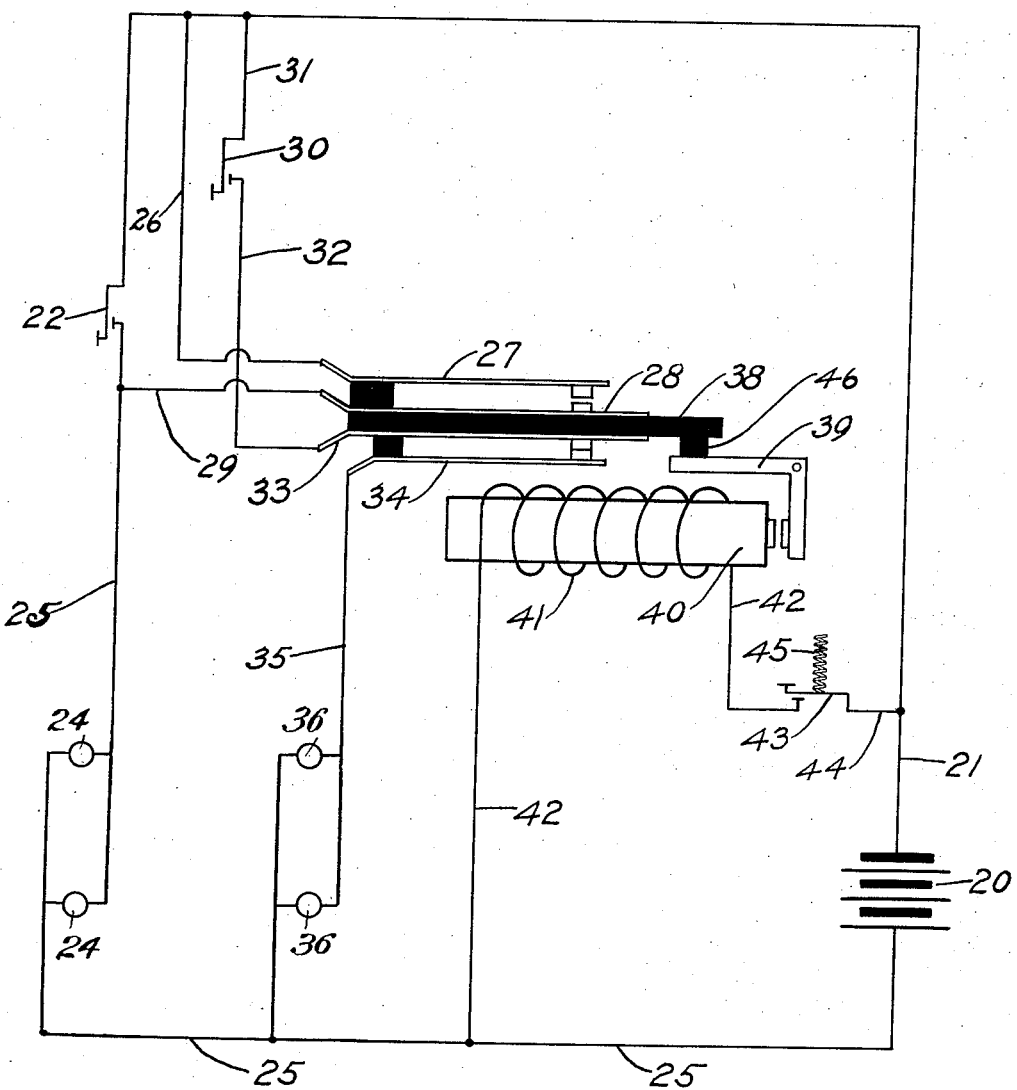

UNITED STATES PATENT OFFICE.

CHARLES F. KETTERING, OF DAYTON, OHIO, ASSIGNOR TO THE DAYTON ENGINEERING LABORATORIES CO., A CORPORATION OF OHIO.

CONTROL FOR ELECTRIC-LIGHTING SYSTEMS.

1,066,432.  Specification of Letters Patent.  Patented July 1, 1913.

Application filed August 10, 1911. Serial No. 643,318.

*To all whom it may concern:*

Be it known that I, CHARLES F. KETTERING, a citizen of the United States, residing at Dayton, county of Montgomery, and State of Ohio, have invented certain new and useful Improvements in Control for Electric-Lighting Systems, of which the following is a full, clear, and exact description.

This invention relates to an improvement in electric lighting systems and is more particularly designed to be employed in systems of this character as applied to land, water and aerial vehicles.

One of the main objects of the present invention resides in the provision of means, whereby certain sets of lamps of an electric lighting system may be extinguished temporarily and other sets of lamps of the system, which are normally cut out, may be lighted.

The following description of the present invention will be directed to the system, as applied to motor vehicles, not with the intention of limiting the invention to such, but simply because of the fact that the invention is especially adaptable to automobiles employing an electric lighting system.

Practically all of the automobiles now in use, which employ an electric lighting equipment, include a powerful set of headlights, generally known as "search lights," which give forth an extremely brilliant and blinding light, and a set of less powerful lamps, known as "side lamps."

While it is practically necessary to employ headlights of this character, when driving through the country or on unlighted thoroughfares, it is equally desirable that some means be provided, whereby these headlights may be temporarily extinguished, as when meeting pedestrians or vehicles approaching from the opposite direction, inasmuch as the brilliancy of these lights is often the cause of a substantial blinding effect on the drivers of approaching vehicles, and has been the direct or indirect cause of many serious accidents. It is equally desirable to have some means, whereby the side lights of the system may be temporarily lighted, during the time that the headlights are extinguished, so as to leave the car with a portion of its lighting equipment, rather than to cause the entire lighting equipment to be cut out.

A further object of the present invention is to provide a supplemental switch, adapted, when closed, to temporarily open the headlight circuit and to simultaneously close a circuit through the side lamps, regardless of the position of the main or permanent switch of said circuit.

Further and incidental objects will appear as the description of the invention progresses, reference being had to the accompanying drawing, wherein a preferred form of one embodiment of the present invention is shown diagrammatically.

Referring to the diagrammatic showing, the numeral 20 designates a source of electrical energy which may be either an accumulator or a current generator of some approved type. One pole of the accumulator has a wire 21 which connects directly with the movable member of switch 22, while the wire 25 which extends from the opposite pole of the battery, connects with the stationary member of said switch, communicating with the sets of side lamps 24.

The normal circuit for the side lamps 24, will be obvious from the above and it will be seen that the circuit may be permanently opened or closed through the operation of the main switch 22.

The normal circuit for the headlights 36, will be as follows: from the battery 20, through wire 21, into the branch wire 31, thence through switch 30, wire 32, through the normally closed coöperating contact plates 33 and 34, of the combined circuit maker and breaker, through wire 35, passing through lamps 36, back to the battery, via wire 25, it being obvious that the switch 30 controls the open or closed condition of the circuit.

The supplemental control spoken of heretofore, for simultaneously cutting off the head lamps and lighting the side lamps temporarily, is effected by means of what is here termed a temporary or resilient switch 43, located in some position convenient for the driver of the vehicle to actuate, the preferred location of this switch, being on the steering wheel. This switch is normally held in open position by means of the spring 45, and it will therefore be seen that only when the driver exerts enough pressure to overcome the influence of the spring, will the switch be closed. This switch forms a part of the supplemental circuit 42, tapped into the main line wires 21 and 25, and includes an electromagnet, comprising the coil 41, and the soft iron core 40.

Directly in alinement with one end of the core 40, a pivoted armature 39 is positioned, one end of which is provided with an insulated button 46, which is normally located adjacent to an insulated finger 38, of the combined circuit maker and breaker. This combined circuit maker and breaker is indirectly controlled by the opening and closing of the switch 43. The construction of the circuit maker and breaker comprises the above referred to insulated finger 38, having a pair of oppositely disposed contact plates 28 and 33, secured to the opposite sides thereof, and adapted to coöperate with the stationary plates 27 and 34 respectively.

As has been stated heretofore, the movable plate 33 and the stationary plate 34 of the circuit maker and breaker, normally comprises a portion of the headlight circuit, the contact between the said plates being normally closed. The other two coöperating plates 27 and 28, are connected respectively, with the wires 26 and 29, which in turn are tapped onto the main line wires 21 and 25 respectively, the wire 26 being tapped onto the side lamp circuit, on one side of the switch 22, while the wire 29 connects with said circuit on the other side of switch 22, whereby a shunt circuit will be formed through the wire 26, contact plates 27 and 28, and wire 29, around the switch 22, at such times as the plate 28 is moved into contact making position with the plate 27.

The operation of the device will be as follows: Should it be desired to temporarily cut out or extinguish the head lamps 36 and to simultaneously light or cut in the side lamps 24, the operator of the vehicle simply presses the movable element of switch 43 to close the supplemental circuit 42. This causes the flow of current to pass through the coil 41 of the electro-magnet and the consequent energizing of the core 40. As soon as the core becomes energized, the armature 39, will be immediately attracted thereto and with the movement of one portion of said armature toward the magnet, a consequent outward movement of the other portion of said armature, will tend to shift the movable element of the combined circuit maker and breaker, this movable element comprising an insulated finger 38 and the attached contact plates 28 and 33. This movement of the circuit maker and breaker will cause the breaking of the main line of the head lamp circuit and the closing of the side lamp circuit, through the shunt circuit, comprising wire 26, contact plates 27 and 28 and wire 29, so that regardless of the open condition of the switch 22, current will be passed into the side lamps and the same maintained in lighted condition as long as the contact is maintained between the plates 27 and 28. As soon as the driver of the vehicle desires to light the head lamps of his lighting equipment, he merely releases pressure from the switch 43, which action will cause the core 40 to become deënergized and the consequent return of the various movable elements of the system to their normal position.

In the specification, I have referred to permanent or main switches, and it is to be understood that the word "permanent" is simply directed to the switches normally used in systems of this character, whereby the circuits of the various sets of lamps may be opened or closed for any desired length of time, by a single operation of the switches of the respective circuits.

While the invention herewith shown and described, comprises a preferred form of one embodiment of said invention, I desire it to be understood that various changes may be made therein, which come within the scope of the following claims.

What I claim is as follows:—

1. In a portable lighting system, the combination with a plurality of independent sets of lamps, having circuit connections; independent switches controlling the opening and closing of each of said circuits; and a supplemental switch controlling an independent circuit for temporarily opening one of said circuits which may be closed, and closing one of said circuits which may be opened.

2. In an electric lighting system for vehicles, independent head and side lamps, having circuit connections; independent switches for controlling the open and closed condition of each of said circuits; and a supplemental switch for temporarily opening the circuit connection with the head lights when said circuit connections are normally closed and temporarily closing the circuit through the side lamps when the normal circuit thereof is opened.

3. In an electric lighting system for vehicles, the combination with a source of electrical energy; independent sets of head and side lamps, having circuit connections therewith; switches for controlling said circuit connections; of a combined circuit maker and breaker normally forming a part of the circuit connections of the set of head lamps; and electrically controlled means for operating said combined circuit maker and breaker, to open the circuit of the set of head lamps when the same is normally closed, and to close the circuit connections with the set of side lamps when the same is normally opened.

4. In an electric lighting system, the combination with a plurality of independent sets of lamps; a source of electrical energy, independent circuit connections therebetween; independent manually operated switches for controlling said circuit connections; and means for temporarily opening one of said normally closed circuits, independent of said switch mechanism and to close another of said circuit connections independent of the normally opened switches thereof.

5. In an electric lighting system, the combination with a plurality of independent sets of lamps; an electrical source; and circuit connections therebetween; of switches for controlling said circuits, operable independently and concurrently to open and close said circuits independently and concurrently; and a supplemental circuit having a separate manually operable switch, said supplemental circuit embodying means for closing one of the lamp circuits and opening another, independent of the switches located in said lamp circuits when the manually operated switch is operated to close the supplemental circuit.

6. In an electric lighting system, the combination with a plurality of independent sets of lamps, having circuit connections; independent switches controlling the opening and closing of each of said circuits; and a supplemental circuit embodying normally closed contact elements included in one of the lamp circuits; and a manual switch for closing said supplemental circuit to open said normally closed contact elements and to concurrently close one of the other lamp circuits.

In testimony whereof I affix my signature in the presence of two subscribing witnesses.

CHARLES F. KETTERING.

Witnesses:
 EARLE WELBORN,
 CHAS. J. RANDOLPH.